United States Patent
Li et al.

(10) Patent No.: US 12,353,032 B2
(45) Date of Patent: Jul. 8, 2025

(54) ENABLING PASSIVE ALIGNMENT FOR LENS ATTACH

(71) Applicant: Intel Corporation, Santa Clara, CA (US)

(72) Inventors: Xiaoqian Li, Chandler, AZ (US); Wesley Morgan, Lake Oswego, OR (US); Nitin Deshpande, Chandler, AZ (US); Divya Pratap, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 959 days.

(21) Appl. No.: 17/213,131

(22) Filed: Mar. 25, 2021

(65) Prior Publication Data

US 2022/0308293 A1    Sep. 29, 2022

(51) Int. Cl.
G02B 6/42    (2006.01)

(52) U.S. Cl.
CPC ........... *G02B 6/423* (2013.01); *G02B 6/4206* (2013.01); *G02B 6/4244* (2013.01)

(58) Field of Classification Search
CPC .... G02B 6/423; G02B 6/4206; G02B 6/4244; G02B 6/3636; G02B 6/3652; G02B 6/4204; G02B 6/4249; G02B 6/4239; G02B 6/4243; G02B 6/425
See application file for complete search history.

(56) References Cited

U.S. PATENT DOCUMENTS

| | | | |
|---|---|---|---|
| 10,146,009 B2 * | 12/2018 | Badihi | G02B 6/428 |
| 10,281,664 B1 * | 5/2019 | Chetrit | G02B 6/4224 |
| 2008/0008419 A1 | 1/2008 | Karhenbuhl et al. | |
| 2015/0293305 A1 | 10/2015 | Nakagawa | |

FOREIGN PATENT DOCUMENTS

| | | |
|---|---|---|
| JP | 2005274700 | 10/2005 |
| JP | 2007178790 | 7/2007 |
| WO | WO-2013025327 | 2/2013 |
| WO | WO-2014093046 | 6/2014 |

OTHER PUBLICATIONS

Greil A et al.: ""Optical 4×4 INP Switch Module With Fiber-Lens-Arrays for Coupling"", Proceedings of the European Conference on Optical Communication (ECOC) Regular Papers. Berlin, Sep. 27-Oct. 1, 1992. Bound as One With vols. 2 & 3; [Proceedings of the European Conference on Optical Communication (ECOC)], Frankfurt, Igvde, DE, vol. 1, Sep. 27, 1992 (Sep. 27, 1992), pp. 529-532, XP000628221, ISBN: 978-3-8007-1896-2 * p. 529-p. 530; figure 1.

Extended European Search Report for European Patent Application No. 22150101.8 mailed Jun. 2, 2022, 12 pgs.

Office Action for European Patent Application No. 22150101.8 mailed Dec. 9, 2024, 7 pgs.

* cited by examiner

*Primary Examiner* — John Bedtelyon
(74) *Attorney, Agent, or Firm* — Schwabe, Williamson & Wyatt P.C.

(57) ABSTRACT

Embodiments disclosed herein include photonics packages. In an embodiment, a photonics package comprises a photonics die and a plurality of v-grooves on the photonics die. In an embodiment, a lens array is optically coupled to a spot size converter on the photonics die. In an embodiment, the lens array comprises a main body and a plurality of lenses extending out from the main body.

25 Claims, 10 Drawing Sheets

ENABLING PASSIVE ALIGNMENT FOR LENS ATTACH

GOVERNMENT LICENSE RIGHTS

This invention was made with Government support under Agreement No. HR0011-19-3-0003, awarded by DARPA. The Government has certain rights in the invention

TECHNICAL FIELD

Embodiments of the present disclosure relate to electronic packages, and more particularly to lens arrays for photonics dies that are passively aligned.

BACKGROUND

The microelectronic industry has begun using optical connections as a way to increase bandwidth and performance. Typically, the optical connections include optical fibers that are mounted to v-grooves on the edge of the photonics die. The optical fibers include a pigtail design that is terminated with a multi-channel MT type optical fiber ferrule. Micro lenses can be used to provide a more compact package solution for handling and provide pluggable solutions for customers during system level assembly. However, there are currently no passive alignment features in order to simplify the alignment between the photonics die and the micro lenses. Currently, active alignment processes are needed. Active alignment processes require additional equipment, and is a time consuming process.

EMBODIMENTS OF THE PRESENT DISCLOSURE

Described herein are lens arrays for photonics dies that are passively aligned, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, lens arrays that are coupled to a photonics die currently require active alignment in order to provide high efficiency coupling. Active alignment requires additional equipment and is a slow process. As such, the active alignment of lens arrays is not compatible with high volume manufacturing (HVM) environments.

Accordingly, embodiments disclosed herein include passive alignment features that can be used to align a lens array with a photonics die. In some embodiments, the lens array can be attached at the die level, which potentially can enable optical testing at the die level before packaging. As such, known good dies can be used in the assembly process in order to improve yield. Additionally, the use of a passively aligned lens array may remove the need to use pigtail fiber connector solutions. As such, package assembly is simplified and pluggable connector solutions may be enabled.

Embodiments disclosed herein include various passive alignment features that may be used. In a first embodiment, lenses extending out from a main body of the lens array may be disposed into v-grooves on the photonics die. In other embodiments, dedicated alignment pins on the lens array may be inserted into v-grooves on the photonics die. The alignment pins may be on the same surface as the lenses or on the opposite surface from the lenses. In other embodiments, a multi-body lens array may be used, where alignment pins on a first body pass through holes in a second body. Such embodiments allow for proper alignment of the alignment pins to the lenses even when the alignment pins are on the opposite surface from the lenses. In yet another embodiment, the lens array may comprise a saw-toothed surface that interfaces with the v-grooves of the photonics die. In some embodiments, a fiber array may be used to slot fibers into the v-grooves of the photonics die. In such embodiments, the lens may be a discrete component attached to the fibers, or the fibers may terminate with a lensed surface. Additional embodiments may include a lens array with an L-shaped body and cylindrical protrusions that nest into the v-grooves of the photonics die. Another embodiment may include a lens array with cylindrical waveguides on one surface an lenses on the opposite surface that are optically coupled with the cylindrical waveguides. The cylindrical waveguides may rest in the v-grooves of the photonics die.

Figure 1A:
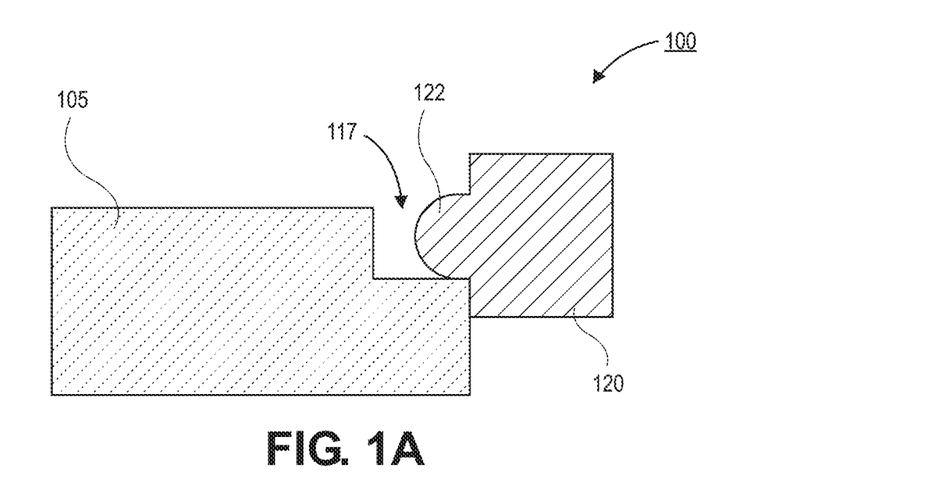
FIG. 1A is a cross-sectional illustration of a photonics die with a v-groove and a lens of a lens array inserted into the v-groove, in accordance with an embodiment.

Referring now to FIG. 1, a cross-sectional illustration of a photonics package 100 is shown, in accordance with an embodiment. In an embodiment, the photonics package 100 may comprise a photonics die 105. The photonics die 105 may be a die that is configured to convert optical signals into electrical signals and/or convert electrical signals into optical signals. The photonics die 105 may be coupled to a processor die (not shown) that operates in the electrical regime.

In an embodiment, the photonics die 105 may comprise a plurality of v-grooves 117. The v-grooves 117 may be aligned with the spot size converter (not shown) that interfaces with an optical waveguide of the photonics die 105. The spot size converter may be provided at an end surface of the v-groove 117 (i.e., the left end of the v-groove 117 in FIG. 1A).

In an embodiment, the photonics package 100 may further comprise a lens array. The lens array may comprise an optically clear body 120 and a plurality of lenses 122. The lens array may be formed of glass or an optically clear polymer material. The lenses 122 may be formed with an etching process or the optically clear body 120 and the lenses 122 may be formed with a molding process. The lenses 122 may extend out from the optically clear body 120.

As shown, the lenses 122 may sit in the v-grooves 117 of the photonics die 105. That is, the lenses 122 are passively aligned with the spot size converter of the photonics die 105 by the v-grooves 117. As such, there is no need for active alignment of the lenses 122. The spacing of the lenses 122 with respect to each other can be tightly controlled by the etching or molding process used to form the lenses 122, and the proper alignment with the photonics die 105 is provided by the structure of the v-grooves 117.

In an embodiment, the lens array may be attached to the photonics die 105 at the die level. Such assembly allows for the photonics die 105 to be tested at an early point of assembly. Therefore, subsequent assembly processes may be able to proceed with known good dies. The use of known good die assembly improves the overall yield of the assembled product.

Figure 1B:
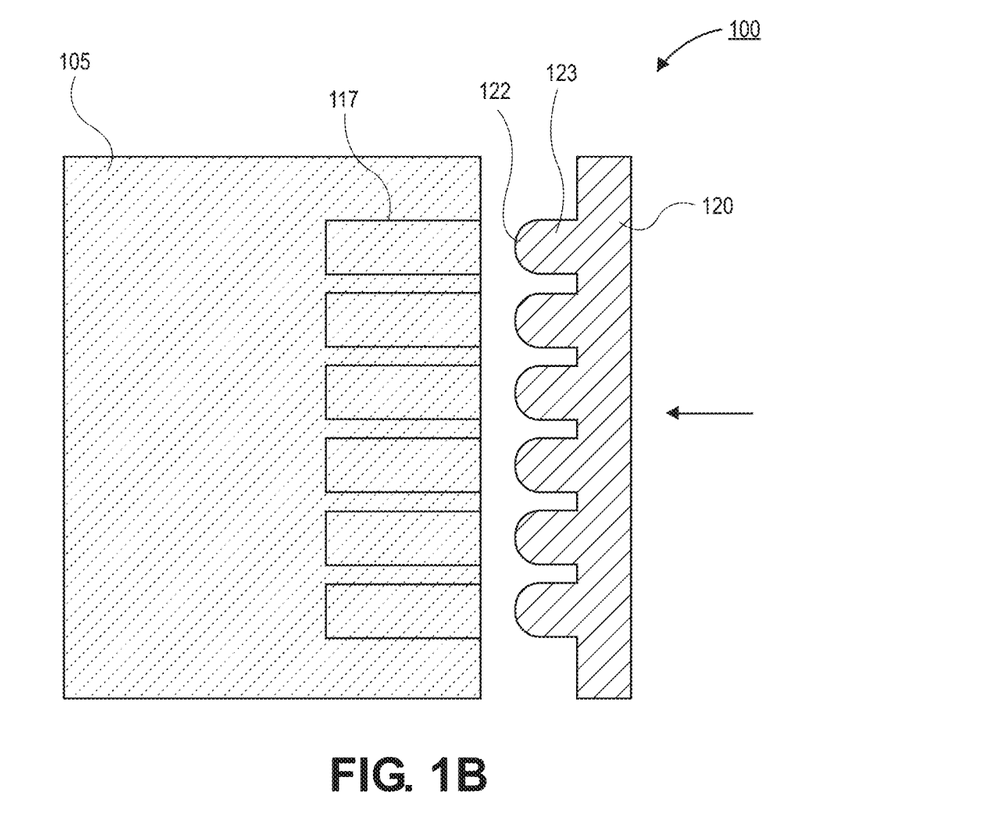
FIG. 1B is a plan view illustration of the photonics die and the lens array showing the alignment between the lenses and the v-grooves of the photonics die, in accordance with an embodiment.

Referring now to FIG. 1B, a plan view illustration of the photonics package 100 is shown, in accordance with an embodiment. As shown, a plurality of lenses 122 are provided along a length of the optically clear body 120. While six lenses 122 are shown, it is to be appreciated that the lens array may include any number of lenses 122 in order to match the design of the photonics die 105. For example, the lens array may comprise eight lenses 122, twelve lenses 122, sixteen lenses 122, or twenty four lenses 122. In an embodiment, the lenses 122 may be provided at the end of cylindrical posts 123. The cylindrical posts 123 increases the length of the lens array that interfaces with the v-grooves 117. In other embodiments, the lenses 122 may be directly protruding from the lens optically clear body 120, and the cylindrical posts 123 may be omitted.

In an embodiment, the lens array is brought towards the photonics die 105, as indicated by the arrow. The lenses 122 then slot into the v-grooves 117 on the photonics die 105. In an embodiment, the lenses 122 and the cylindrical posts 123 may have a total length that is less than a length of the v-grooves 117. In other embodiments, the lenses 122 and the cylindrical posts 123 may have a length that is substantially equal to the length of the v-grooves 117 or even a length that is greater than the length of the v-grooves 117. As shown, the number of v-grooves 117 may be equal to the number of lenses 122. That is, each v-groove 117 accommodates a single one of the lenses 122.

Figure 2A:
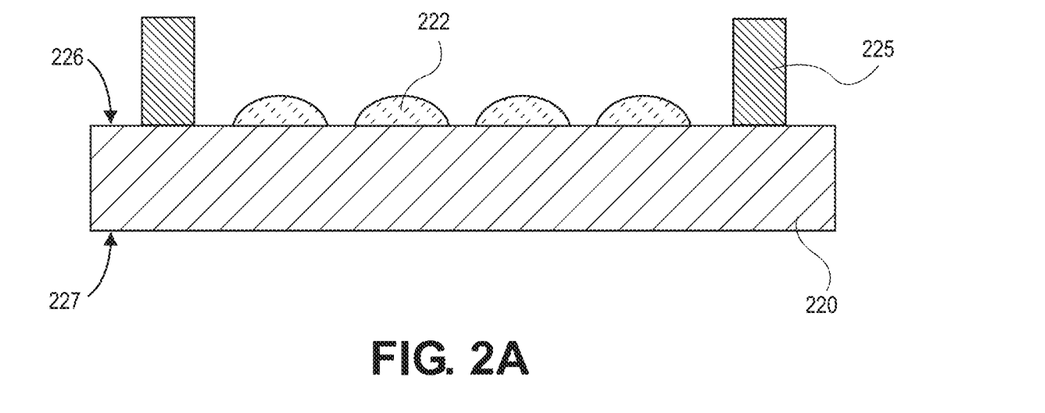
FIG. 2A is a cross-sectional illustration of a lens array with a pair of alignment pins, in accordance with an embodiment.

Referring now to FIG. 2A, a cross-sectional illustration of a lens array is shown, in accordance with an additional embodiment. In an embodiment, the lens array comprises a main body 220 and a plurality of lenses 222 extending out from the main body 220. The main body 220 and the lenses 222 may be an optically clear material, such as glass or an optically clear polymer. The main body 220 may have a first surface 226 and a second surface 227 that is opposite from the first surface 226. In an embodiment, the lenses 222 may extend out from the first surface 226.

In an embodiment, the lens array may further comprise alignment pins 225. The alignment pins 225 may also extend out from the first surface 226. That is, the alignment pins 225 and the lenses 222 may extend out from the same surface of the main body 220. In an embodiment, while shown as a different shading, it is to be appreciated that the alignment pins 225, the lenses 222, and the main body 220 may be formed from a single material as a monolithic structure. The alignment pins 225 and the lenses 222 may be formed with an etching process. Since the alignment pins 225 and the lenses 222 are on the same first surface 226 of the main body, the alignment between the alignment pins 225 and the lenses 222 may be tightly controlled. As such, when the alignment pins 225 are properly aligned with the photonics die (not shown in FIG. 2A), the lenses 222 will also be properly aligned with the photonics die.

In FIG. 2A, four lenses 222 are shown. However, it is to be appreciated that the lens array may comprise any number of lenses 222 in order to accommodate the photonics die. The alignment pins 225 are provided on opposite ends of the lenses 222. That is, a first alignment pin 225 is on the left side of the lenses 222, and a second alignment pin 225 is on the right side of the lenses 222. In other embodiments, more than two alignment pins 225 may be used.

Figure 2B:
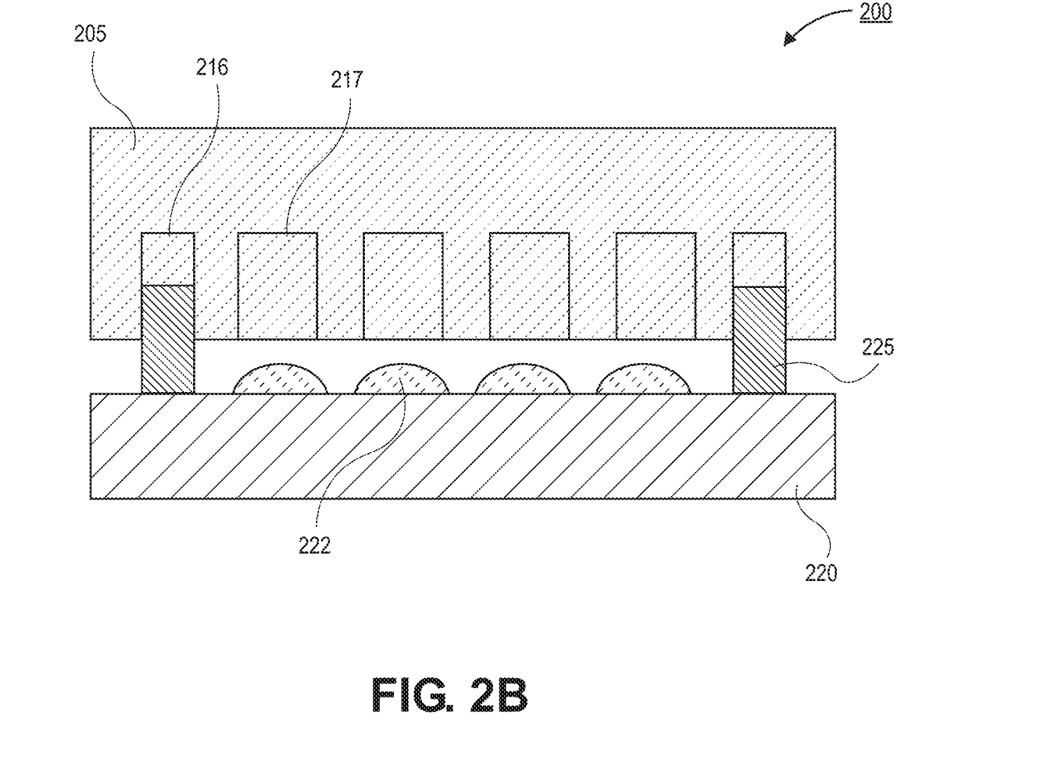
FIG. 2B is a plan view illustration of a lens array interfacing with a photonics die, where the alignment pins are inserted into v-grooves on the photonics die, in accordance with an embodiment.

Referring now to FIG. 2B, a plan view illustration of a photonics package 200 is shown, in accordance with an embodiment. As shown, a lens array is coupled to a photonics die 205. The lens array may be substantially similar to the lens array describe above with respect to FIG. 2A. For example, alignment pins 225 and lenses 222 may extend out from the same surface of the main body 220. In an embodiment, the alignment pins 225 may be inserted into v-grooves 216 on the photonics die 205. The v-grooves 216 may be for alignment purposes only. For example, the v-grooves 216 may not necessarily function as part of the optical path for optical signals to/from the photonics die 205. The v-grooves 216 may be a different dimension than the v-grooves 217 (which are used for optical signaling) in some embodiments. In other embodiments, the v-grooves 216 may be substantially the same dimension as the v-grooves 217. In an embodiment, the lenses 222 may remain outside of the v-grooves 217, as shown in FIG. 2B. In other embodiments, the lens array may be inserted so that the alignment pins 225 are inserted into the v-grooves 216, and the lenses 222 are inserted into the v-grooves 217.

Figure 3A:
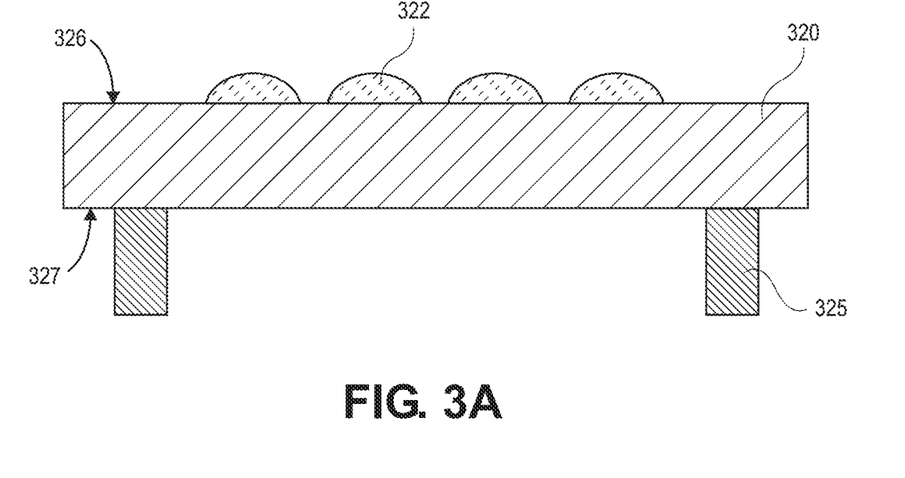
FIG. 3A is a cross-sectional illustration of a lens array with a pair of alignment pins that are provided on an opposite surface from the lenses, in accordance with an embodiment.

Referring now to FIG. 3A, a cross-sectional illustration of a lens array is shown, in accordance with an additional embodiment. In an embodiment, the lens array comprises a main body 320. The main body 320 has a first surface 326 and a second surface 327 opposite from the first surface 326. A plurality of lenses 322 may extend out from the first surface 326, and alignment pins 325 may extend out from the second surface 326. That is, the lenses 322 and the alignment pins 325 may be on opposite surfaces of the main body 320.

In an embodiment, the alignment pins 325, the lenses 322, and the main body 320 may be formed from a single material and be a monolithic structure. For example, an etching or molding process of an optically clear material (e.g., glass or an optically clear polymer) may be used to form the lens array. In an embodiment where an etching process is used, a first etching process may be used to form the lenses 322, and a second etching process may be used to form the alignment pins 325. In such instances, careful control of the two etching processes may be necessary in order to maintain proper alignment between the alignment pins 325 and the lenses 322.

In FIG. 3A, four lenses 322 are shown. However, it is to be appreciated that any number of lenses 322 may be included on the lens array in order to accommodate a given design of the photonics die (not shown in FIG. 3A). Similarly, while two alignment pins 325 are shown, it is to be appreciated that any number of alignment pins 325 may be used. In the particular embodiment shown in FIG. 3A, a first alignment pin 325 is on a left side of the lenses 322 and a second alignment pin 325 is on a right side of the lenses 322.

Figure 3B:
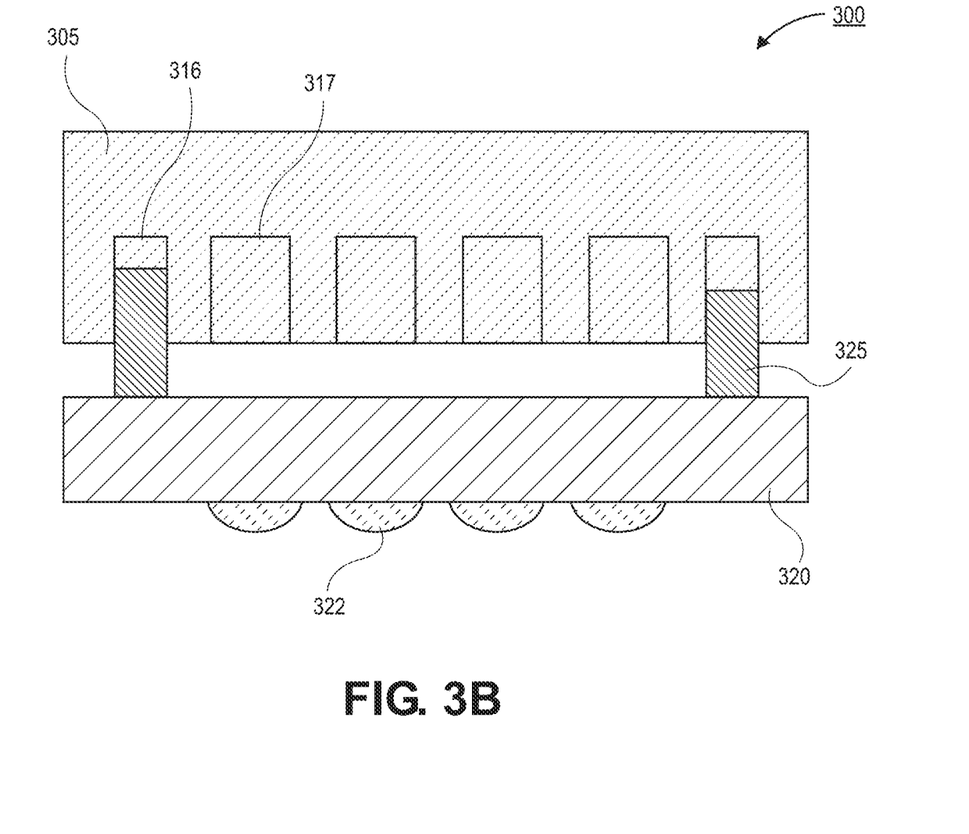
FIG. 3B is a plan view illustration of a lens array interfacing with a photonics die, where the alignment pins are inserted into v-grooves on the photonics die, in accordance with an embodiment.

Referring now to FIG. 3B, a plan view illustration of a photonics package 300 is shown, in accordance with an embodiment. The photonics package 300 comprises a photonics die 305 and lens array. The lens array may be substantially similar to the lens array described with respect to FIG. 3A. As shown, the alignment pins 325 may be inserted into v-grooves 316. The lenses 322 may face away from the photonics die 305 since they are on the opposite surface of the main body 320 from the alignment pins 325.

In an embodiment, the photonics package 300 may comprise v-grooves 317. However, the v-grooves 317 may remain unfilled since the lenses 322 are on the opposite face of the main body 320. In other embodiments, the v-grooves 317 may be omitted, and the spot size converter may be provided at the edge of the photonics die 305. In the illustrated embodiment, the main body 320 is spaced away from an edge of the photonics die 305. However, in other embodiments, the main body 320 may be provided flush against the edge of the photonics die 305.

Figure 4A:
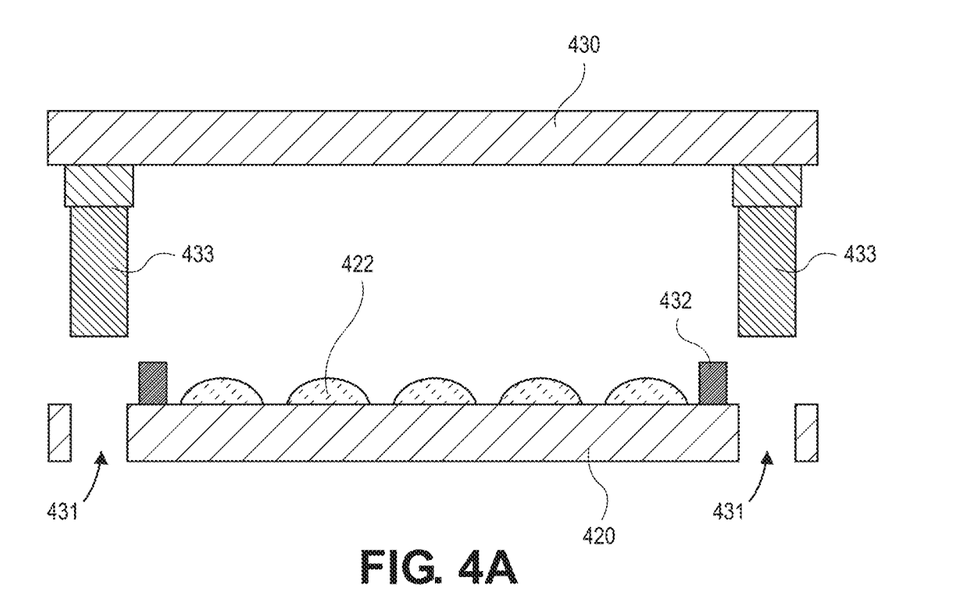
FIG. 4A is a cross-sectional illustration of a lens array with a first body and a second body, where the lenses are on the first body and alignment pins on the second body pass through holes in the first body, in accordance with an embodiment.

Referring now to FIG. 4A, a cross-sectional illustration of a multi-part lens array is shown, in accordance with an embodiment. In an embodiment, the multi-part lens array may comprise a first body 420 and a second body 430. The first body 420 and the second body 430 may be optically clear materials, such as glass or an optically clear polymer. In an embodiment, lenses 422 may extend out from a surface of the first body 420. While five lenses 422 are shown, it is to be appreciated that any number of lenses may be used to accommodate the photonics die (not shown in FIG. 4A).

In an embodiment, the first body 420 may also comprise two holes 431. The two holes 431 may be formed with an etching process. Particularly, the etching process used to form the lenses 422 may also be used to form the two holes 431. As such, the positioning of the two holes 431 can be precisely aligned with the positioning of the lenses 422. In an embodiment, the first body 420 may also comprise barriers 432. The barriers 432 may provide a boundary that prevents adhesive material (e.g., epoxy) used to secure the first body 420 to the second body 430 from getting over the lenses 422.

In an embodiment, the second body 430 may comprise alignment pins 433. The alignment pins 433 may be formed by etching the second body 430. The alignment pins 433 may be precisely aligned with each other to have a distance between the two alignment pins 433 that is substantially equal to the distance between the two holes 431 in the first body 420. As such, when the alignment pins 433 are inserted into the two holes 431, the alignment pins 433 will be precisely aligned with the lenses 422.

Figure 4B:
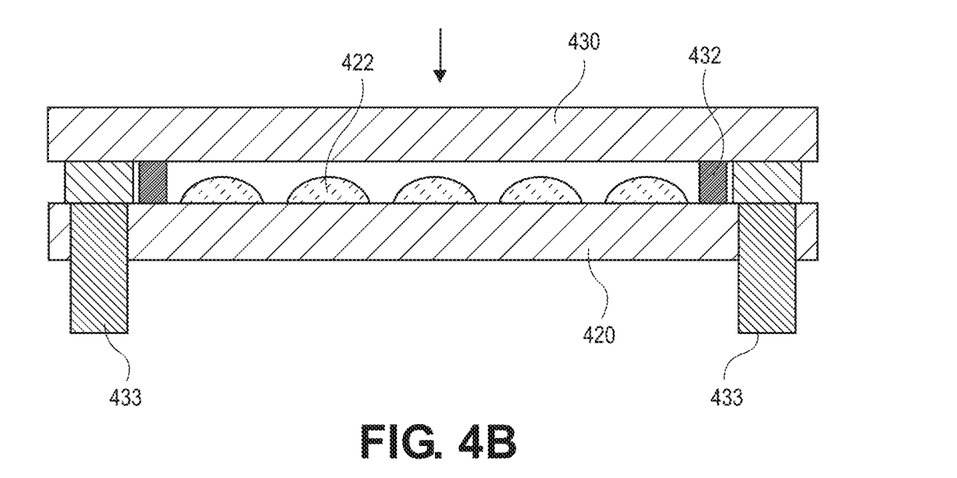
FIG. 4B is a cross-sectional illustration of the lens array in FIG. 4A with the first body attached to the second body, in accordance with an embodiment.

Referring now to FIG. 4B, a cross-sectional illustration of the lens array after the second body 430 is adhered to the first body 420 is shown, in accordance with an embodiment. In an embodiment, an epoxy or other adhesive (not shown) may be used to secure the alignment pins 433 in the two holes 431. The resulting structure has the lenses 422 between the first body 420 and the second body 430, and the alignment pins 433 exiting out the bottom surface of the first body 420. Accordingly, a structure similar to the structure shown in FIG. 3A (i.e., with respect to the alignment pins 433 and the lenses 422 being on opposite surfaces of the first body 420) can be provided. However, the embodiment in FIG. 4B differs in that the alignment pins 433 can be precisely aligned with the lenses 422, as described above.

Also shown in FIG. 4B is the barriers 432 sealing off the lens area from the periphery of the lens array. For example, the barriers 432 may extend up from the first body 420 and contact a surface of the second body 430. As such, an epoxy or other adhesive used to secure the alignment pins 433 into the two holes 431 is prevented from flowing over the lenses 422. The barriers 432 may also provide a controlled standoff height to prevent the second body 430 from contacting the lenses 422.

The lens array in FIG. 4B may subsequently be inserted into a photonics die similar to the embodiment shown in FIG. 3B. That is, the alignment pins 433 may be inserted into v-grooves of the photonics die. The lenses 422 may be on the opposite surface of the first body 420 so that they are facing away from the photonics die.

Figure 5A:
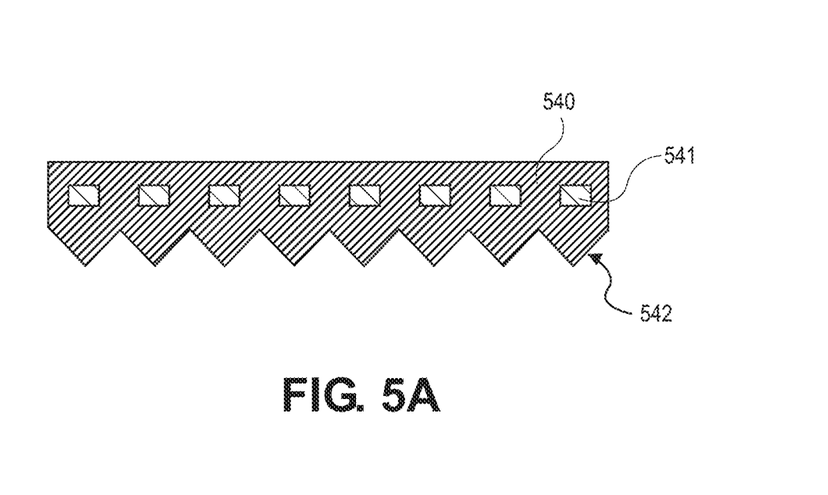
FIG. 5A is a cross-sectional illustration of a lens array with optical waveguides and a saw-tooth surface for interfacing with v-grooves on a photonics die, in accordance with an embodiment.

Referring now to FIG. 5A, a cross-sectional illustration of a lens array is shown, in accordance with an additional embodiment. In an embodiment, the lens array comprises a body 540. In an embodiment, a plurality of waveguides 541 are embedded in the body 540. The number of waveguides 541 may be equal to the number of v-grooves in a photonics die (not shown in FIG. 5A). In an embodiment, the main body 540 may also comprise a saw-toothed surface 542. The saw-toothed surface 542 may interface with the v-grooves of the photonics die in order to properly align the waveguides 541 to the spot size converter. In the illustrated embodiment, the saw-toothed surface 542 is an angular surface, but in other embodiments, the saw-toothed surface 542 may be rounded.

Figure 5B:
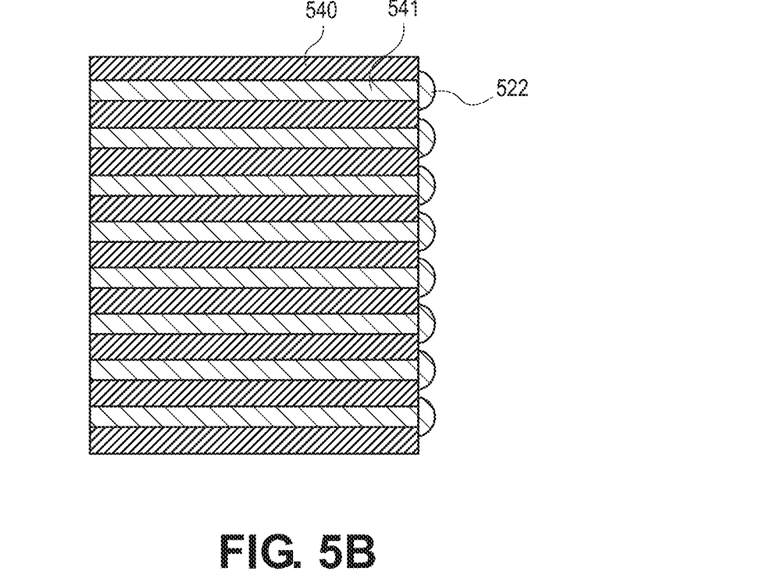
FIG. 5B is a cross-sectional illustration of the lens array showing lenses attached to the waveguides, in accordance with an embodiment.

Referring now to FIG. 5B, a cross-sectional illustration of a lens array is shown, in accordance with an additional embodiment. As shown, the waveguides 541 terminate at a lens 522. The lenses 522 may be discrete components that are attached to the waveguides 541. In other embodiments, the lenses 522 may be integrated with the waveguides 541 as a monolithic structure. In an embodiment, the lens array may be inserted into the v-grooves so that the lenses 522 are facing away from the spot size converter.

Figure 6A:
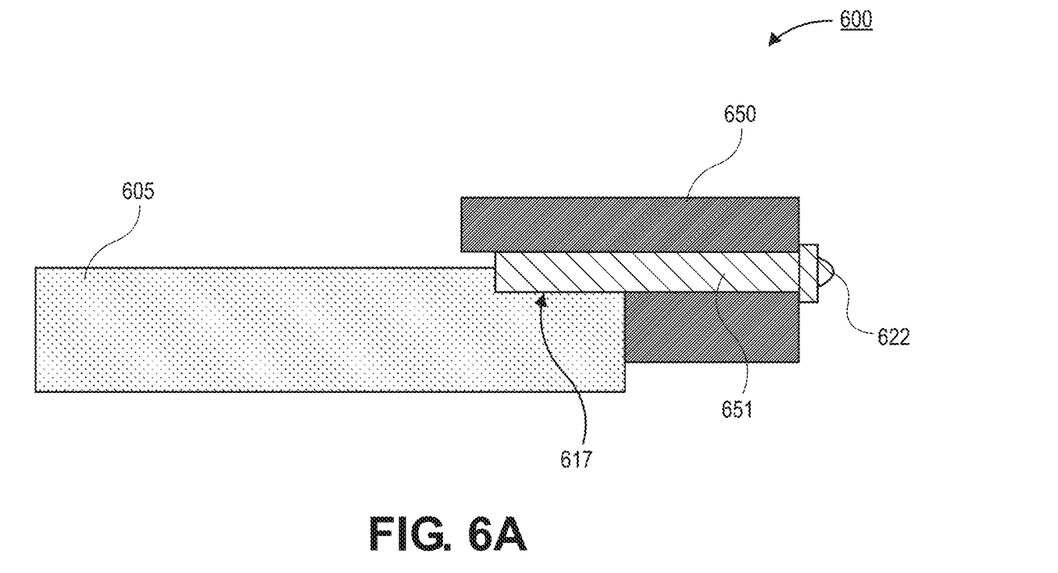
FIG. 6A is a cross-sectional illustration of a lens array with an optical fiber passing through a lens housing and a discrete lens on the end of the optical fiber, in accordance with an embodiment.

Referring now to FIG. 6A, a cross-sectional illustration of a photonics package 600 is shown, in accordance with an embodiment. In an embodiment, the photonics package 600 comprises a photonics die 605 and a lens array. The photonics die 605 may comprise v-grooves 617. The lens array may comprise a fiber housing 650. The fiber housing 650 houses an optical fiber 651. The optical fiber 651 extends out from the fiber housing 650 and sits in the v-groove 617. In an embodiment, the fiber housing 650 secures together a plurality of optical fibers 651 and allows for easy insertion into the v-grooves 617. As such, each individual fiber does not need to be aligned and inserted into the v-grooves 617.

Figure 6B:
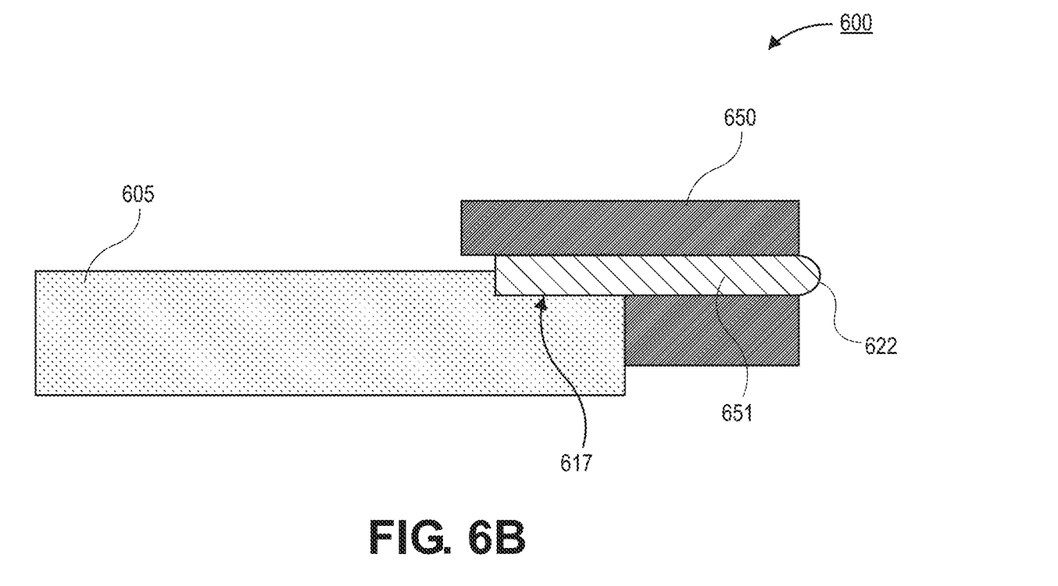
FIG. 6B is a cross-sectional illustration of a lens array with an optical fiber passing through a lens housing and a lens integrated as part of the optical fiber, in accordance with an embodiment.

In an embodiment, the optical fiber 651 may terminate at a lens 622. In the embodiment shown in FIG. 6A, the lens 622 is a discrete component from the optical fiber 651. However, as shown in FIG. 6B, the lens 622 may be integrated as part of the optical fiber 651. That is, the optical fiber 651 itself can be formed into a lensed surface.

Figure 7:
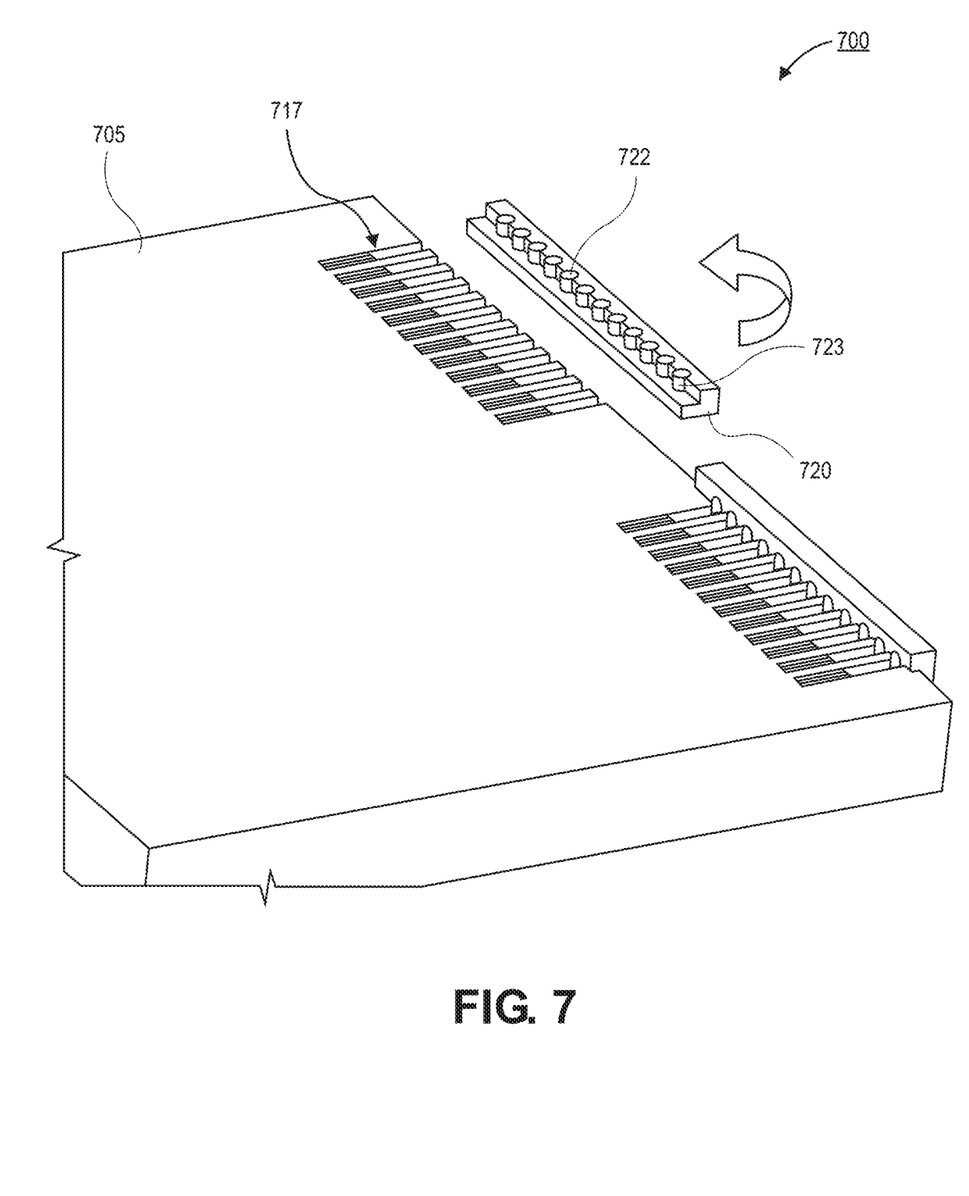
FIG. 7 is a perspective view illustration of a photonics die and an L-shaped lens array that interfaces with v-grooves on the photonics die, in accordance with an embodiment.

Referring now to FIG. 7, a perspective view illustration of a photonics package 700 is shown, in accordance with an additional embodiment. In an embodiment, the photonics package 700 comprises a photonics die 705 with v-grooves 717. One or more lens arrays may be coupled to the v-grooves 717 of the photonics die 705. As shown in FIG. 7, a first lens array is coupled to the v-grooves 717 and a second lens array is oriented to show the structure of the lens array.

As shown, the lens array may comprise a body 720 with an L-shaped cross-section. Cylindrical pillars 723 may extend out from a surface of the body 720. The cylindrical pillars 723 may be sized to fit into the v-grooves 717 of the photonics die 705. Ends of the cylindrical pillars 723 may be lenses 722. By sitting the cylindrical pillars 723 into the v-grooves 717, the lenses 722 become properly aligned.

In an embodiment, the lens array may be formed from a single optically clear material. For example, a glass or an optically clear polymer may be used. The cylindrical pillars 723 and the lenses 722 may be formed with an etching process. Particularly only a single surface of the lens array needs to be etched in some embodiments.

Figure 8A:
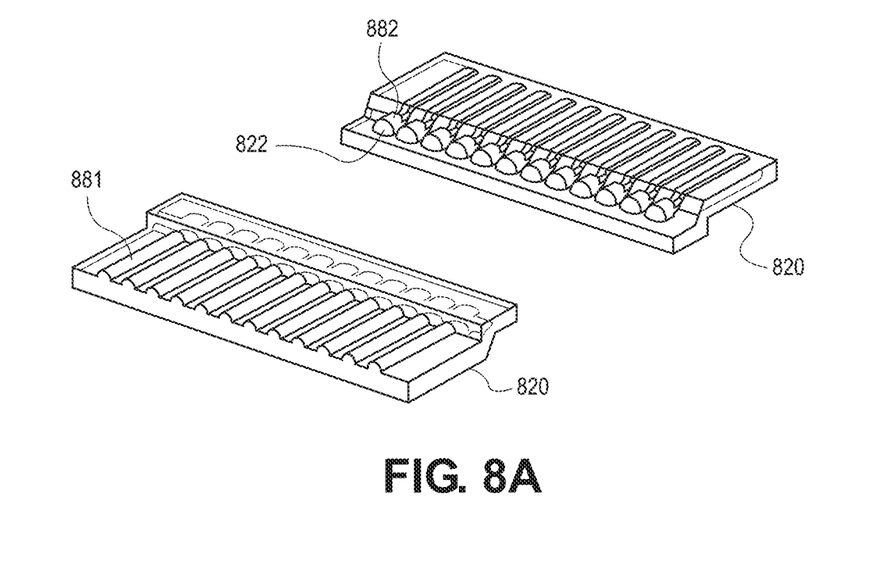
FIG. 8A is a pair of lens arrays in different orientations, in accordance with an embodiment.

Referring now to FIG. 8A, a pair of lens arrays are shown, in accordance with an embodiment. The two lens arrays shown are the same, but are oriented in different directions in order to see all of the features clearly. As shown in the bottom lens array, cylindrical waveguides 881 are provided on a recessed surface of the main body 820. As shown in the top lens array, cylindrical waveguides 882 that end with lenses 822 are shown. The cylindrical waveguides 882 and 881 may be optically coupled together. That is, an optical signal can propagate from the cylindrical waveguide 881 to the cylindrical waveguide 882, and ultimately to the lens 822.

In an embodiment, the lens arrays may be fabricated with an etching process or a molding process. In an etching process, a first etch may be used to form the cylindrical waveguides 881 and a second etching process may be used to form the cylindrical waveguides 882 on the opposite surface of the main body 820. A molding process may provide a more tight alignment between the cylindrical waveguides 881 and the cylindrical waveguides 882.

Figure 8B:
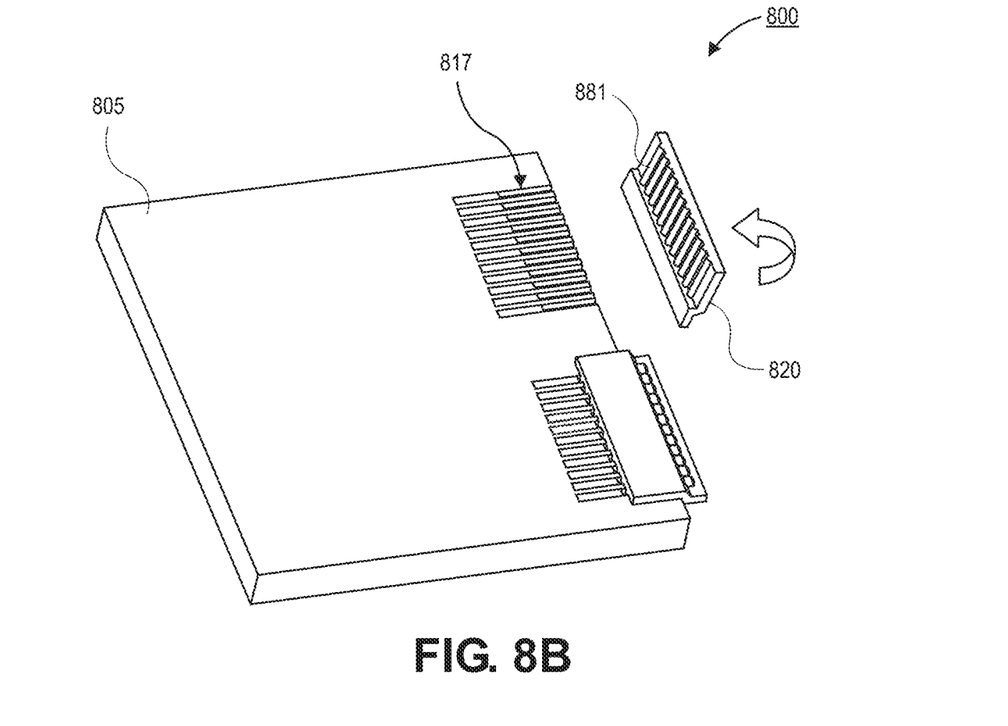
FIG. 8B is a perspective view illustration of a photonics die and lens arrays similar to those shown in FIG. 8A interfacing with v-grooves on the photonics die, in accordance with an embodiment.

Referring now to FIG. 8B, a perspective view illustration of a photonics package 800 is shown, in accordance with an embodiment. The photonics package 805 comprises a photonics die 805 with v-grooves 817. A first lens array is shown on the photonics package 805 and a second lens array is oriented to see the structure that interfaces with the v-grooves 817. As shown, the cylindrical waveguides 881 align with the v-grooves 817. As such, a passive alignment if provided.

Figure 9:
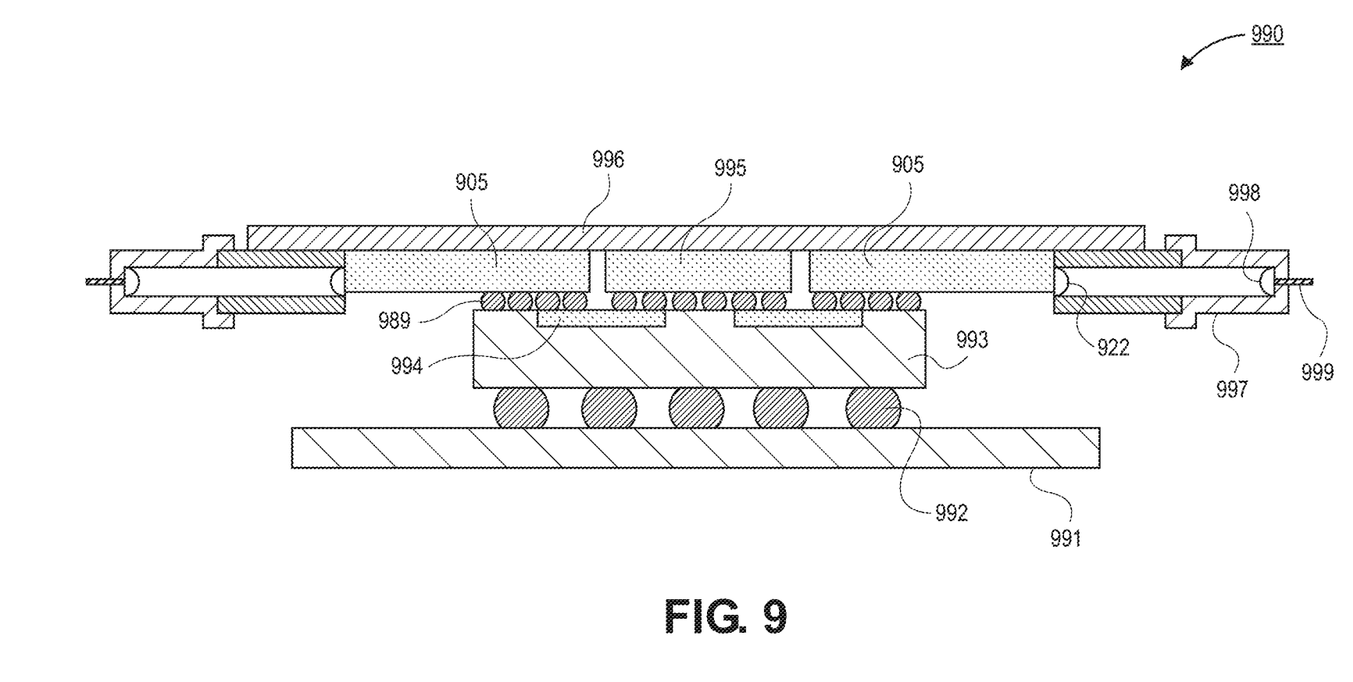
FIG. 9 is a cross-sectional illustration of a photonics package with lens arrays attached to the photonics dies, in accordance with an embodiment.

Referring now to FIG. 9 a cross-sectional illustration of a photonics system 990 is shown, in accordance with an embodiment. In an embodiment, the photonics system 990 may comprise a board 991, such as a printed circuit board (PCB). The board 991 may be coupled to a package substrate 993 by interconnects 992. The interconnects 992 are shown as solder balls, but it is to be appreciated that any interconnect architecture may be used, such as, but not limited to, socketing architectures. In an embodiment, a processor 995 and photonics dies 905 may be coupled to the package substrate 993 by interconnects 989. In an embodiment, the photonics dies 905 may be communicatively coupled to the processor 995 by embedded bridges 994 or by any other high density interconnect architecture. An integrated heat spreader (IHS) 996 may be thermally coupled to the backside surfaces of the photonics dies 905 and the processor 995.

In an embodiment, an array of lenses 922 may be provided along edges of the photonics dies 905. The lenses 922 may be passively aligned to the optical path of the photonics dies 905 using any of the lens array architectures described in greater detail above. For example, portions of the lens array may interface with v-grooves of the photonics dies 905.

In an embodiment, an external plug 997 may interface with the lenses 922. Any plugging architecture may be used. The external plug 997 may comprise a second lens 998 that interfaces with an optical cable 999. The lenses 922 and the second lens 998 may be collimating lenses to provide expanded beam coupling. Expanded beam coupling eases the alignment tolerances and provides for improved optical coupling.

Figure 10:
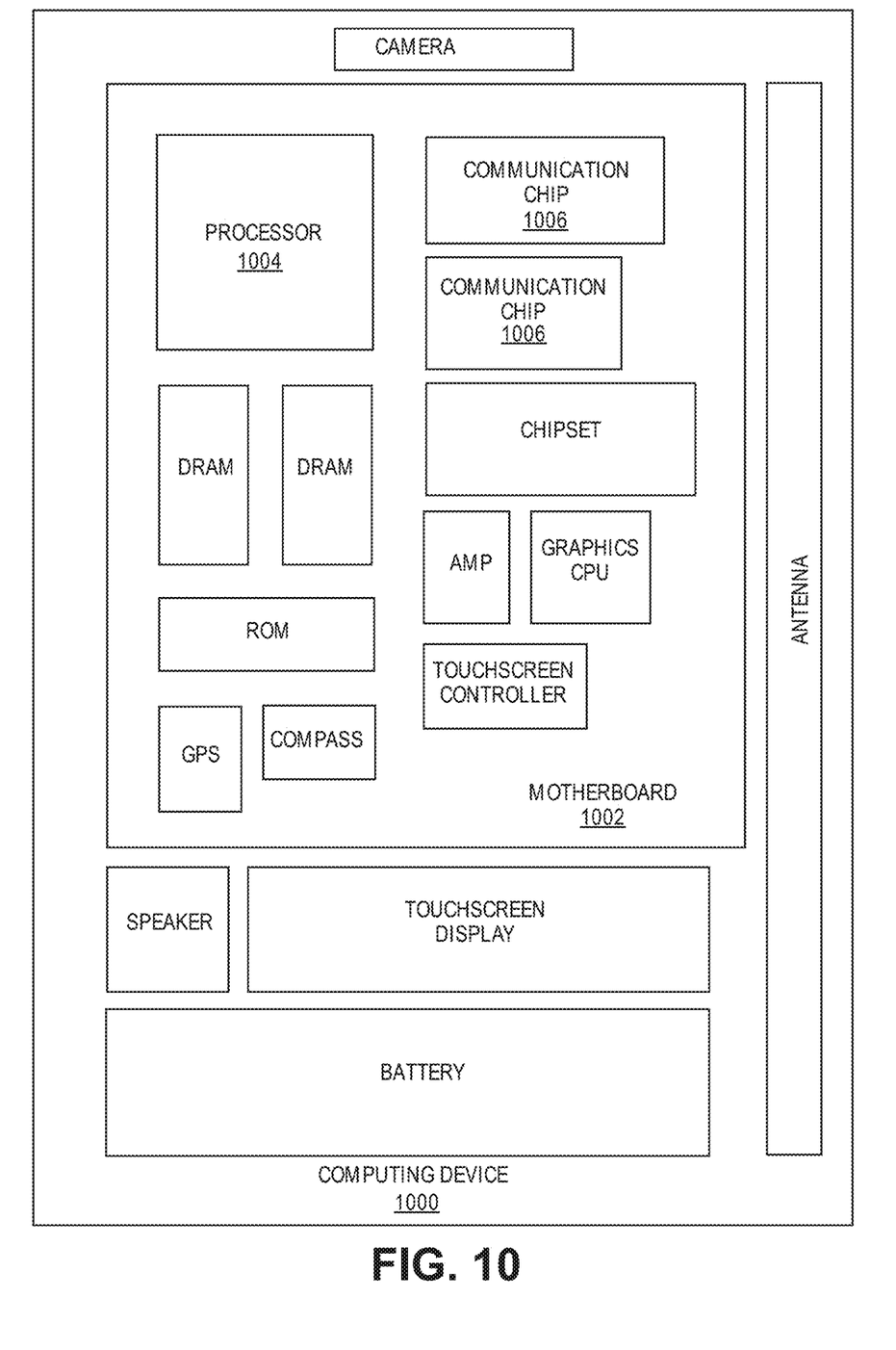
FIG. 10 is a schematic of a computing device built in accordance with an embodiment.

FIG. 10 illustrates a computing device 1000 in accordance with one implementation of the invention. The computing device 1000 houses a board 1002. The board 1002 may include a number of components, including but not limited to a processor 1004 and at least one communication chip 1006. The processor 1004 is physically and electrically coupled to the board 1002. In some implementations the at least one communication chip 1006 is also physically and electrically coupled to the board 1002. In further implementations, the communication chip 1006 is part of the processor 1004.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 1006 enables wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 of the computing device 1000 includes an integrated circuit die packaged within the processor 1004. In some implementations of the invention, the integrated circuit die of the processor may be part of a photonics system that comprises a passively aligned lens array coupled with a photonics die, in accordance with embodiments described herein. The term "processor" may refer to any device or portion of a device that processes electronic data from registers and/or memory to transform that electronic data into other electronic data that may be stored in registers and/or memory.

The communication chip 1006 also includes an integrated circuit die packaged within the communication chip 1006. In accordance with another implementation of the invention, the integrated circuit die of the communication chip may be part of a photonics system that comprises a passively aligned lens array coupled with a photonics die, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: a photonics package, comprising: a photonics die; a plurality of v-grooves on the photonics die; and a lens array optically coupled to a spot size converter on the photonics die, wherein the lens array comprises: a main body; and a plurality of lenses extending out from the main body.

Example 2: the photonics package of Example 1, wherein individual ones of the plurality of lenses are disposed in different ones of the plurality of v-grooves.

Example 3: the photonics package of Example 1 or Example 2, wherein the lens array further comprises: a pair of alignment posts extending out from the main body.

Example 4: the photonics package of Example 3, wherein the alignment posts and the plurality of lenses extend out from a first surface of the main body.

Example 5: the photonics package of Example 3, wherein the alignment posts extend out from a first surface of the main body, and wherein the plurality of lenses extend out from a second surface of the main body.

Example 6: the photonics package of Example 3, wherein the alignment posts are disposed in the v-grooves.

Example 7: the photonics package of Examples 1-6, wherein the lens array further comprises: a pair of holes through the main body; a second body; a pair of alignment posts extending out from the second body, wherein the alignment posts extend through the pair of holes through the main body.

Example 8: the photonics package of Example 7, wherein the second body is secured to the first body by an epoxy.

Example 9: the photonics package of Example 7 or Example 8, further comprising: a pair of barriers between the pair of holes and the lenses.

Example 10: the photonics package of Examples 1-9, further comprising: a plurality of waveguides extending through the main body, wherein each waveguide is optically coupled to one of the plurality of lenses; and a saw-tooth pattern on a bottom surface of the main body.

Example 11: the photonics package of Example 10, wherein the saw-tooth pattern sits into the plurality of v-grooves on the photonics die.

Example 12: the photonics package of Examples 1-11, wherein the main body is L-shaped.

Example 13: the photonics package of Example 12, wherein cylindrical protrusions extend out from a surface of the main body, and wherein the plurality of lenses are at ends of the cylindrical protrusions.

Example 14: the photonics package of Example 13, wherein the cylindrical protrusions are set into the plurality of v-grooves on the photonics die.

Example 15: the photonics package of Examples 1-14, further comprising: cylindrical ridges on a first surface of the main body; and a recessed surface on a second surface of the main body, wherein the lenses are on the recessed surface.

Example 16: the photonics package of Example 15, wherein the cylindrical ridges are set into the plurality of v-grooves on the photonics die.

Example 17: a photonics package, comprising: a photonics die; a plurality of v-grooves in the photonics die; and a lens array optically coupled to a spot size converter on the photonics die, wherein the lens array comprises: a fiber housing; a plurality of optical fibers in the fiber housing; and a plurality of lenses at an end of the optical fibers.

Example 18: the photonics package of Example 17, wherein the plurality of optical fibers are set into the plurality of v-grooves on the photonics die.

Example 19: the photonics package of Example 17 or Example 18, wherein the plurality of lenses are discrete bodies from the plurality of optical fibers.

Example 20: the photonics package of Examples 17-19, wherein the plurality of lenses are fabricated as part of the plurality of optical fibers.

Example 21: a photonics system, comprising: a board; a package substrate coupled to the board; a processor on the package substrate; a photonics die on the package substrate and communicatively coupled to the processor; and a lens array coupled to an edge of the photonics die.

Example 22: the photonics system of Example 21, wherein the lens array comprises: a main body; and a plurality of lenses extending out from the main body.

Example 23: the photonics system of Example 22, wherein individual ones of the plurality of lenses are disposed in different ones of the plurality of v-grooves.

Example 24: the photonics system of Examples 21-23, wherein the lens array further comprises: a pair of alignment posts extending out from the main body.

Example 25: the photonics system of Examples 21-24, wherein the lens array further comprises: a pair of holes through the main body; a second body; a pair of alignment posts extending out from the second body, wherein the alignment posts extend through the pair of holes through the main body.

What is claimed is:

1. A photonics package, comprising:
   a photonics die;
   a plurality of v-grooves on the photonics die; and
   a lens array optically coupled to a spot size converter on the photonics die, wherein the lens array comprises:
   a main body; and
   a plurality of lenses extending out from the main body.

2. The photonics package of claim 1, wherein individual ones of the plurality of lenses are disposed in different ones of the plurality of v-grooves.

3. The photonics package of claim 1, wherein the lens array further comprises:
   a pair of alignment posts extending out from the main body.

4. The photonics package of claim 3, wherein the alignment posts and the plurality of lenses extend out from a first surface of the main body.

5. The photonics package of claim 3, wherein the alignment posts extend out from a first surface of the main body, and wherein the plurality of lenses extend out from a second surface of the main body.

6. The photonics package of claim 3, wherein the alignment posts are disposed in the v-grooves.

7. The photonics package of claim 1, wherein the lens array further comprises:
   a pair of holes through the main body;
   a second body;
   a pair of alignment posts extending out from the second body, wherein the alignment posts extend through the pair of holes through the main body.

8. The photonics package of claim 7, wherein the second body is secured to the first body by an epoxy.

9. The photonics package of claim 7, further comprising:
   a pair of barriers between the pair of holes and the lenses.

10. The photonics package of claim 1, further comprising:
    a plurality of waveguides extending through the main body, wherein each waveguide is optically coupled to one of the plurality of lenses; and
    a saw-tooth pattern on a bottom surface of the main body.

11. The photonics package of claim 10, wherein the saw-tooth pattern sits into the plurality of v-grooves on the photonics die.

12. The photonics package of claim 1, wherein the main body is L-shaped.

13. The photonics package of claim 12, wherein cylindrical protrusions extend out from a surface of the main body, and wherein the plurality of lenses are at ends of the cylindrical protrusions.

14. The photonics package of claim 13, wherein the cylindrical protrusions are set into the plurality of v-grooves on the photonics die.

15. The photonics package of claim 1, further comprising:
    cylindrical ridges on a first surface of the main body; and
    a recessed surface on a second surface of the main body, wherein the lenses are on the recessed surface.

16. The photonics package of claim 15, wherein the cylindrical ridges are set into the plurality of v-grooves on the photonics die.

17. A photonics package, comprising:
    a photonics die;
    a plurality of v-grooves in the photonics die; and
    a lens array optically coupled to a spot size converter on the photonics die, wherein the lens array comprises:
    a fiber housing;
    a plurality of optical fibers in the fiber housing; and
    a plurality of lenses at an end of the optical fibers.

18. The photonics package of claim 17, wherein the plurality of optical fibers are set into the plurality of v-grooves on the photonics die.

19. The photonics package of claim 17, wherein the plurality of lenses are discrete bodies from the plurality of optical fibers.

20. The photonics package of claim 17, wherein the plurality of lenses are fabricated as part of the plurality of optical fibers.

21. A photonics system, comprising:
    a board;
    a package substrate coupled to the board;
    a processor on the package substrate;
    a photonics die on the package substrate and communicatively coupled to the processor, and a plurality of v-grooves on the photonics die; and
    a lens array coupled to an edge of the photonics die.

22. The photonics system of claim 21, wherein the lens array comprises:
    a main body; and
    a plurality of lenses extending out from the main body.

23. The photonics system of claim 22, wherein individual ones of the plurality of lenses are disposed in different ones of the plurality of v-grooves.

24. The photonics system of claim 22, wherein the lens array further comprises:
    a pair of alignment posts extending out from the main body.

25. The photonics system of claim 22, wherein the lens array further comprises:
    a pair of holes through the main body;
    a second body;
    a pair of alignment posts extending out from the second body, wherein the alignment posts extend through the pair of holes through the main body.

* * * * *